United States Patent [19]

Akers, Jr. et al.

[11] Patent Number: 4,631,175
[45] Date of Patent: Dec. 23, 1986

[54] PREPARATION OF CHLORINATED POLYOLEFINS

[75] Inventors: James B. Akers, Jr., Baton Rouge, La.; Douglas E. Leng, Midland, Mich.; Randall J. Normand, Plaquemine, La.

[73] Assignee: The Dow Chemical Company, Midland, Mich.

[21] Appl. No.: 702,162

[22] Filed: Feb. 15, 1985

Related U.S. Application Data

[62] Division of Ser. No. 591,653, Mar. 20, 1984, Pat. No. 4,524,189.

[51] Int. Cl.$^4$ ................................................. B01J 8/10
[52] U.S. Cl. .................................. 422/135; 422/140; 422/225; 422/230; 422/231; 422/310; 285/332.2; 285/334.3
[58] Field of Search ............... 422/230, 231, 135, 134, 422/140, 225–228, 310; 210/219, 220; 137/891, 893; 285/332.2, 158, 334.1, 334.2, 334.3

[56] References Cited

U.S. PATENT DOCUMENTS

| | | | |
|---|---|---|---|
| 2,254,352 | 9/1941 | Cloud et al. | 422/225 |
| 2,523,578 | 9/1950 | Lewis | 285/332.2 |
| 2,577,856 | 12/1951 | Nelson | 422/135 |
| 2,582,317 | 1/1952 | Donohue | 422/228 |
| 2,678,914 | 5/1954 | Kalinske | 210/219 |
| 3,003,986 | 10/1961 | Long | 422/135 |
| 3,240,514 | 3/1966 | Bell | 285/158 |
| 3,870,631 | 3/1975 | Fassell et al. | 210/219 |
| 4,029,345 | 6/1977 | Romanelli | 285/334.2 |
| 4,166,610 | 9/1979 | Yamazaki et al. | 266/89 |
| 4,370,304 | 1/1983 | Hendriks et al. | 422/224 |
| 4,501,720 | 2/1985 | Cheng | 422/226 |

FOREIGN PATENT DOCUMENTS 861531 2/1961 United Kingdom ............. 285/334.1

Primary Examiner—Michael S. Marcus

[57] ABSTRACT

Method and apparatus for the chlorination of polyolefins in aqueous suspension. The method includes subjecting the suspension of the polyolefin to a submerged jet of chlorine gas at a velocity sufficient to atomize the chlorine; i.e., at least about sixty feet per second. By this method a very intimate mixture of chlorine and aqueous suspension is formed, whereby the chlorination proceeds more efficiently and at a lower chlorine pressure. Further advantages include a more uniformly-substituted product.

2 Claims, 2 Drawing Figures

PREPARATION OF CHLORINATED POLYOLEFINS

This is a divisional of application Ser. No. 591,653, filed 3/20/84 now U.S. Pat. No. 4,524,189.

BACKGROUND OF THE INVENTION

The present invention relates to the preparation of halogenated polyolefins. More particularly, the invention relates to an improved method for chlorinating polyethylene and polypropylene in aqueous suspension.

The patent and journal literature is replete with descriptions of various methods for preparing chlorinated polyolefins. In general, however, the description merely states that the polyolefin is chlorinated in aqueous suspension by introducing a stream of chlorine gas beneath the liquid level of the suspension. In the absence of a method for efficiently dispersing the chlorine gas in the suspension, the chlorination is not as efficient nor the product as uniform as it would be if the chlorine were better dispersed. The present invention provides an improved method for the introduction of chlorine gas into an aqueous suspension of a polyolefin.

SUMMARY OF THE INVENTION

In general, the present invention provides a method and a suitable apparatus for the more efficient chlorination of a particulate polyolefin or chlorinated polyolefin suspended in an aqueous medium. The method comprises subjecting the suspension of the polyolefin or chlorinated polyolefin to a submerged jet of chlorine gas traveling at a velocity sufficient to atomize the chlorine into extremely finely-divided bubbles intimately mixed with the aqueous suspension. In general, a linear velocity of at least about sixty feet per second is required. The upper practical limit of the gas velocity is the sonic velocity. After the desired degree of chlorination has been achieved, the product may be separated and dried by any of several well-known means. The term "atomize" as used herein means to disperse the stream of chlorine gas into such minute bubbles that the gas is intimately mixed with the aqueous suspension, forming in effect a separate phase near the point of introduction of the gas. The term "submerged" means below the liquid level of the suspension.

Suitable apparatus for the practice of the present invention includes a vessel equipped with an agitator for keeping a particulate solid suspended in a liquid and a port extends outwardly from the interior of the vessel for introducing chlorine gas into the vessel. Means for forming the high velocity jet of chlorine introduced into the vessel through the port is also included in the apparatus. This means should provide the jet of gas at sufficient linear velocity to atomize the gas in the aqueous suspension.

DESCRIPTION OF THE PREFERRED EMBODIMENTS

The following description illustrates the manner in which the principles of the present invention are applied, but is not to be construed as in any sense limiting the scope of the invention.

Figure 1:
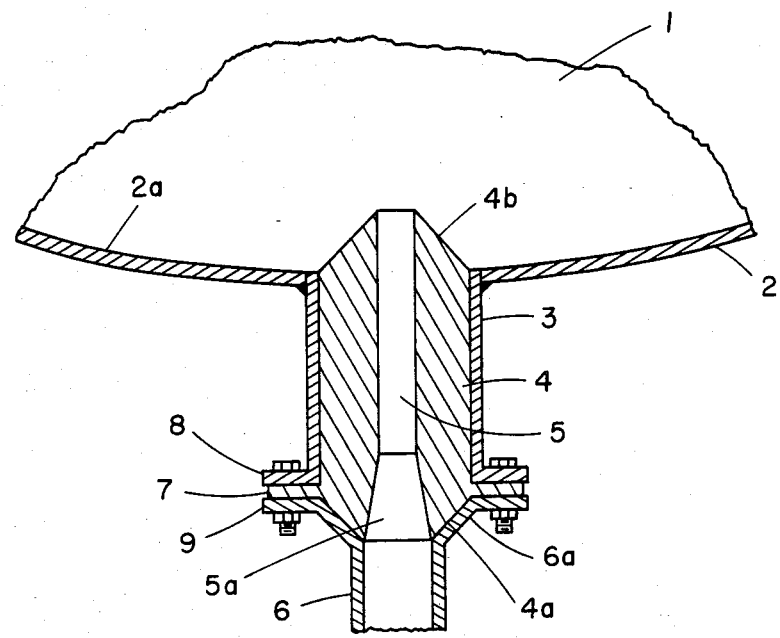
FIG. 1 is a cross-sectional elevation of apparatus made according to the present invention.

More specifically, FIG. 1 shows small section of a chlorination reactor 1 made according to the present invention. The reactor 1 includes a vessel wall 2, only a small section of which is shown in the drawing. The reactor 1 is equipped with means (not shown) for keeping a particulate mass of solids suspended in a liquid. Suspension means for this purpose are well-known in the art, and include for example mechanical and electrical agitators or mixers. A port 3 extends through and outwardly from the interior of the vessel wall 2. Disposed within the port 3 is an internal plug 4 with an internal passageway 5. The plug 4 forms a gas-tight seal with the port 3 and with a gas-delivery line 6. One end 5a of the passageway 5 widens and forms a continuation of the enlarged end 6a of the gas-delivery line 6. The other end of the passageway 5 opens into the interior of the reactor 1. The exit end 4b of the plug 4 extends obliquely a short distance into the interior of the reactor 1. By a short distance is meant a distance that is small compared with the total length of the plug 4 and passageway 5. The exit end 4b of the plug 4 defines an angle of between about 120 degrees and about 150 degrees with the interior surface 2a of the vessel wall 2. Preferably, the angle so defined is between about 130 degrees and about 140 degrees, and even more preferably it is between about 134 degrees and about 136 degrees. The entrance end 4a of the plug 4 tapers outwardly to conform to the enlarged end 6a of the gas-delivery line 6, thereby forming a gas-tight seal when the flanges 7, 8 and 9 of the plug 4, port 3 and line 6 are fastened together as shown.

The preparation of chlorinated polyolefins is carried out by suspending in water the polyolefin used as reactor feed and the chlorinated polyolefin formed, while subjecting the suspension to a jet of chlorine gas injected beneath the surface of the suspension from the passageway 5 at a rate sufficient to atomize the chlorine and form an intimate mixture of the chlorine and the suspension. In order to atomize the chlorine it is necessary that the linear velocity of the gas stream as it leaves the passageway 5 be at least about sixty feet per second. Preferably, the linear velocity of the gas is between about one hundred and about three hundred feet per second.

Besides forming a gas-tight seal between the gas-delivery line 6 and the port 3, the plug 4 provides needed protection of the passageway 5 from liquid forces and from abrasion encountered in the environment inside the reactor 1. Keeping the solids in suspension requires that the slurry be vigorously agitated, with the result that any objects protruding into the reactor 1 beyond the vessel wall 2 below the liquid level are subjected to intense mechanical wear. By extending the exit end 4b of the plug 4 into the interior of the reactor 1 and by inclining the exit end 4b of the plug 4 away from the inside surface 2a of the vessel wall 2, the swirling mass of suspended solids is directed inward into the reactor 1 and into the jet of chlorine gas, thereby forming a combined stream of gas, liquid, and solids in which the three phases are intimately mixed.

The temperature at which the reaction is carried out is generally between about 200° and about 300° F. Preferably, the reaction is initiated at a lower temperature, which is increased as the reaction progresses. A trace amount of a wetting agent may beneficially be dissolved in the water used to suspend the particulate polyolefin and chlorinated polyolefin.

While the present invention is most advantageously applied to the preparation of chlorinated polyolefins, especially polyethylene and polypropylene, it should be recognized that the invention is applicable to any process requiring efficient contact between a gas and a solid suspended in a liquid. Advantages of the present invention for the chlorination of polyolefins include a more uniform distribution of chlorine in the final chlorinated product; a drastic reduction in frequency of chlorine feed line-plugging; and the capability of operating the chlorination reactor at a lower pressure, at a faster flow rate of chlorine, or both.

The invention will now be illustrated by the following examples, which are intended merely to demonstrate the principles and use of the invention, and which should not be construed to limit in any way the scope of the invention. Example 1 is a comparative example in which high-density polyethylene was chlorinated using conventional technology by introducing the chlorine into the suspension at a rate less than that required to atomize the chlorine. Example 2 is an example illustrating the invention, and showing the improved results obtained with the invention.

EXAMPLE 1

Chlorine was fed through a gas-delivery line which extended below the surface of an agitated suspension of high-density polyethylene powder in water, at a rate of 0.82 pounds per hour per pound of polyethylene, and a linear flow velocity of eleven feet per second. The chlorine flow was continued for about one and one-half hours, with the reactor temperature rising over that period of time from an initial value of 210° F. to a final value of about 280° F. The composition of the chlorinated polyethylene separated and recovered as product comprised thirty-six percent chlorine by weight. The relationship between reactor temperature and pressure is shown as the upper curve in FIG. 2.

EXAMPLE 2

Figure 2:
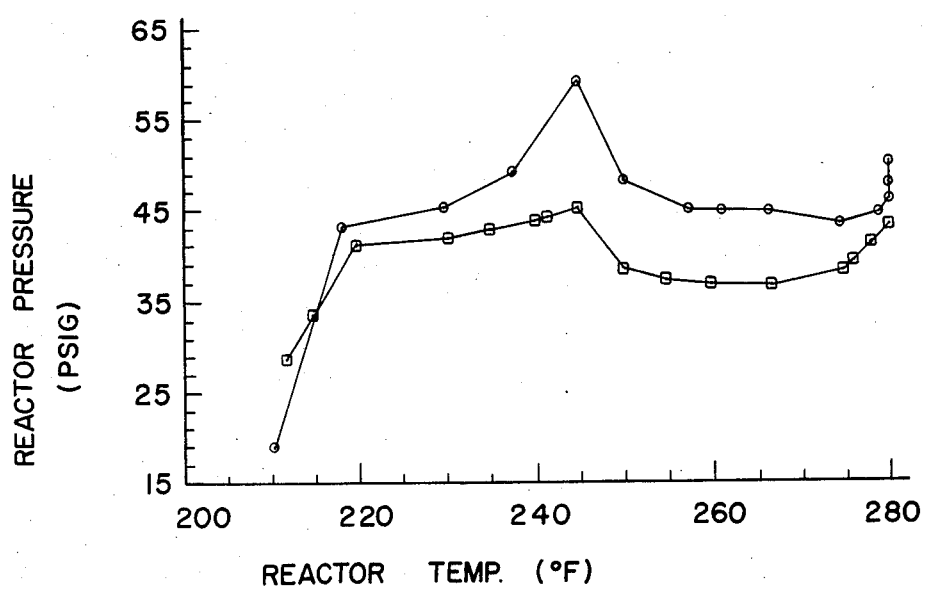
FIG. 2 is a graph showing improved temperature-pressure conditions achieved for the chlorination of polyethylene with the method and apparatus of the present invention.

Using the apparatus shown in FIG. 1, a chlorination was carried out using the same conditions and same temperature-time schedule used in Example 1, except the linear flow velocity of the chlorine was changed to 180 feet per second. The final product, after separation and drying, contained thirty-six percent chlorine by weight. The temperature-pressure relationship observed in this example is shown as the lower curve in FIG. 2. Examination of the resulting curves in FIG. 2 shows that the use of the present invention made it possible to achieve the same degree of chlorination under otherwise identical conditions while employing significantly lower pressures for delivering chlorine to the reactor. Instead of chlorinating the polyethylene at the same flow rate and a lower pressure of chlorine, it is of course also possible to chlorinate at a faster flow rate and the same pressure, thereby substantially decreasing the time required to produce the chlorinated polyethylene. Other ways of utilizing the improvements inherent in the present invention, including for example the preparation of a more uniformly substituted product, will be apparent to those skilled in the art.

While certain representative embodiments and details have been shown for the purpose of illustrating the present invention, it will be apparent to those skilled in the art that various changes and modifications can be made therein without departing from the spirit and scope of the invention.

What is claimed is:

1. An apparatus for contacting a particulate polyolefin or chlorinated polyolefin solid suspended in a liquid with a gas, comprising: a vessel defining an interior space and including an agitator for keeping the solid suspended in the liquid; inlet means located in a bottom wall of said vessel for introducing chlorine gas into said vessel, said inlet means including a tubular member attached at one end to said bottom wall and extending outwardly and away from the bottom wall, jet-forming means disposed in the tubular member for forming a jet of chlorine gas introduced into the vessel, said jet-forming means including a plug disposed within the tubular member, said plug having an internal passageway through which the chlorine gas is introduced into the vessel, the plug having an end defining a surface which is tapered and extends into the interior space of the vessel from an inner surface of the bottom wall, with the tapered surface of the end of the plug defining with the inner surface of the bottom wall an angle of between about 120 degrees to about 150 degrees; and means for connecting the tubular member to a chlorine gas delivery line.

2. The apparatus of claim 1, wherein the angle is from about 130 degrees to about 140 degrees.

* * * * *